2,753,268

Patented July 3, 1956

2,753,268
CHEESE PACKAGING

James D. Ingle, Chicago, Ill., and Arnold N. Nawrocki, Curwensville, Pa., assignors to Swift & Company, Chicago, Ill., a corporation of Illinois No Drawing. Application July 24, 1952,
Serial No. 300,782

3 Claims. (Cl. 99—178)

The present invention relates in general to a method for packaging cheese in flexible containers so as to obviate mold growth, and more particularly, to a method of packaging cheese under vacuum in such containers, and to the packages produced thereby.

One of the major problems faced in the packaging of cheese has been the development of mold growth on the surface of the cheese. Mold growth is known to take place primarily in the presence of oxygen. The obvious solution to the mold problem in cheese packaging would therefore appear to be the packaging of cheese in the absence of oxygen. To this end, various methods of packaging cheese under vacuum have been developed by the prior art. However, experience has shown that cheese packages, even when sealed under what would normally be considered a good degree of vacuum, still permitted the development of mold growth on the cheese. For example, a package containing one-half pound of sliced cheese sealed under 27 inches of vacuum still contains in excess of 1.0 ml. of air. Controlled experiments have indicated visible mold growth can take place on processed cheese when only 0.2 ml. of air is available. Known vacuumizing processes have failed to remove sufficient air from cheese packages to bring the air volume below that which will support mold growth and, additionally, the presence of 1.0+ ml. of air within the package prevents a proper close fit of the wrapper. Inert gas packaging, as practiced by the art, has also left a gas volume exceeding 1.0 ml. in the package described above with the result that the wrapper has not been in intimate contact with the cheese.

Therefore, it is an object of the present invention to provide a method for the packaging of cheese which will prevent the formation of mold growths on the cheese.

It is a further object of the present invention to provide a method for increasing the degree of vacuum in a cheese package to a degree sufficient to prevent mold growth therein.

An additional object of the present invention is to provide a method for the packaging of cheese whereby the degree of vacuum obtaining within the cheese package upon standing is substantially greater than the degree of vacuum actually applied to the package before it is sealed.

Additional objects, if not specifically set forth herein, will be readily apparent to one skilled in the art from the following detailed description of the invention.

Generally, the present invention contemplates the packaging of cheese under vacuum in such a manner that the gas volume within the completed cheese package after standing is less than 1.0 ml. More specifically, the present method comprises placing the cheese to be packaged in an open, flexible, pliable, heat-sealable wrapper, flushing the wrapper and the surface of the cheese with a stream of carbon dioxide gas, thereafter applying a vacuum to said wrapper to exhaust substantially all of the carbon dioxide therefrom, and heat-sealing the wrapper around the cheese while under said vacuum. It has been discovered that by providing an atmosphere of carbon dioxide gas completely surrounding the cheese, prior to drawing a vacuum thereon, most of the air in and around the cheese is displaced. Obviously this result could be achieved by the use of any inert gas including nitrogen or the like. However, the use of carbon dioxide as the flushing gas has been discovered to be critical in producing a package for cheese which will not support mold growth.

A cheese package, produced by first flushing the wrapper and included cheese with carbon dioxide and then vacuumizing and sealing, has been found upon standing to contain a considerably higher degree of vacuum than was actually applied to the package in evacuating the same. The explanation for this phenomenon would appear to be that carbon dioxide is selectively dissolved or absorbed by the cheese. Cheese contains, in general, about 40% moisture and about 30% fat. It is believed that the small amount of carbon dioxide remaining in the package after a vacuum has been drawn thereon is dissolved, upon standing, in the moisture and/or fat of the cheese. In any event, a cheese package produced in the manner set forth above will develop a greater degree of vacuum upon standing. It has been found that cheese packaged in this manner will not develop a mold growth even upon prolonged storage under conditions favorable to mold growth. Prior to vacuumizing a package which has been flushed with carbon dioxide, analysis of the gas in the package indicates an 80–90% carbon dioxide content. After vacuumizing under a 27 inch vacuum and holding the package for a period of about three days, tests have indicated a substantially complete absence of carbon dioxide in the package. The carbon dioxide remaining after vacuumizing will be almost completely dissolved within this period of time, thus producing a greater degree of vacuum within the package than existed at the actual time of sealing of the package, e. g. less than 1.0 ml. gas in a one-half pound cheese package. The absorption begins immediately upon placing the cheese in the carbon dioxide atmosphere, as is shown in Table II following.

From the standpoint of mold development, the absence of air within the package is but one of two factors which are significant. The second of these factors is a close and intimate contact between the cheese surface and the wrapper. Therefore, it is essential that the wrapper be highly flexible and pliable. Preferably the wrapper will be heat-sealable in nature, and it is also desirable in many instances that the wrapper be transparent. A large number of films are avialable which will fulfill these requirements, as for example cellophane coated with a thermoplastic material such as a wax-resin mixture. One further characteristic of the wrapper material is that it must be substantially impervious to the passage of air and carbon dioxide. An inspection of packages, made from this type of material in the manner aforesaid, has indicated that these packages have a substantially tighter fitting wrapper after several days than do packages vacuum packaged either in air alone or after flushing with any inert gas other than carbon dioxide.

No particular structure with regards the package is critical to the present invention. Any of the known methods of forming pliable wrapping material about an article to be enclosed so as to be air-tight may be used. Likewise, the structure of the finished package may follow any of the known types of packages presently used for cheese or like materials.

The method of the present invention is considered applicable to any cured, natural or processed cheese. For example, the present method has been satisfactorily applied to the packaging of both natural cheddar cheese and pasteurized processed cheddar cheese, pimento cheese and brick cheese. The only difference between the natural cheddar cheese and the pasteurized processed cheddar or American cheese is that the latter has had some emulsifying salts added to it before heating under agitation to about 160° F. The processed cheese resulting from this treatment differs from the natural cheese in that the body is perfectly homogeneous and the fat is held much more tightly. Processed cheese and cured, natural cheese appear to have about the same degree of carbon dioxide absorbing properties. The method is not considered applicable, however, to natural cheese which has not been cured. The reason for this is that natural cheese evolves gases during the early stages of curing. However, any natural cheese which has been aged for about 60 to 90 days or longer will not evolve sufficient gas when vacuum packaged to destroy the increase in vacuum resulting from the absorption of carbon dioxide in the packages of the present invention. In the case of pasteurized process cheeses, no curing or gas liberation whatsoever takes place after the cheese has been cooked. Hence, any process cheese may be satisfactorily packaged by the present method.

The following table illustrates the tremendous improvement in vacuum within packages produced in accordance with the present invention as contrasted with packages produced by drawing a vacuum on the identical cheese in an atmosphere of air.

*Table I*

| Package No. | Air Pack, Vol. gas after 1 hour, milliliters | $CO_2$ Pack, Vol. gas after 1 hour, milliliters |
| --- | --- | --- |
| I | 1.4 | 0.5 |
| II | 1.0 | .5 |
| III | 1.2 | .5 |
| IV | 1.0 | .5 |

The cheese used in developing the data set forth in the above tables was identical in the case of the packages produced by the present method and those produced by vacuumizing in air. In each case, a pasteurized process cheese or American cheese was used. The packages upon which the above data was developed were, in each instance, formed from an identical packaging material, namely "Parakote." ("Parakote" is a trade name for a wrapping material comprising a transparent film such as cellophane rendered heat sealable by a coating containing a wax-resin mixture). The degree of vacuum drawn on each package was the same, namely 27 inches of mercury. It will be seen that measurement of the total amount of gas in the packages after one hour shows those packages put up using carbon dioxide to contain less gas than those put up using air. Since the available space within the packages is the same, it is obvious that the package containing the least gas has the highest degree of vacuum obtaining therein.

As an illustration of the selectiveness of the absorption of carbon dioxide by processed cheese, comparative tests were run on cheese held in an atmosphere of $CO_2$ and on the same cheese held in an atmosphere of $N_2$. The following results were obtained:

*Table II*

| Time, minutes | Vacuum Packed in $CO_2$ Atmosphere, ($CO_2$ Absorbed), (milliliters) | Vacuum Packed in $N_2$ Atmosphere, ($N_2$ Absorbed), (milliliters) |
| --- | --- | --- |
| 0 | 0 | 0 |
| 25 | 31 | 0 |
| 50 | 51.5 | 0 |
| 85 | 63 | 0 |
| 90 | 66 | 0 |
| 125 | 74 | 0 |
| 170 | 93.5 | 0 |
| 270 | 100 | 0 |
| 410 | 116 | 0 |

In obtaining the results of Table II, identical process cheeses were used. The rate of gas absorption was measured at room temperature. It will be seen from the results of Table II that the property of absorption by cheese is unique to carbon dioxide, and that equivalent results are not obtained by employing other inert gases.

Obviously, many modifications and variations of the invention as hereinbefore set forth may be made without departing from the spirit and scope thereof, and therefore only such limitations should be imposed as are indicated in the appended claims.

We claim:

1. A method for packaging cheese to inhibit mold growth thereon comprising: forming a wrapper of a pliable, flexible material; placing a body of a cheese selected from the group consisting of pasteurized process cheeses and fully-cured natural cheeses which no longer evolve any substantial amount of gases within said wrapper; flushing said wrapper and said cheese with carbon dioxide gas; drawing a vacuum on said wrapper and cheese to remove substantially all of the carbon dioxide and other gases surrounding the same; and sealing the package while under said vacuum to produce a package which upon standing develops a greater degree of vacuum than was applied thereto before sealing through the absorption of the carbon dioxide remaining in the package by the cheese.

2. A method for the packaging of cheese which comprises placing a pasteurized process cheese in a wrap composed of pliable, flexible, material; providing an atmosphere of carbon dioxide gas within said wrap and around said cheese; applying a vacuum to said wrap to remove substantially all of the carbon dioxide therefrom; and thereafter heat-sealing said wrap to provide a package containing a very small amount of gas, said gas consisting substantially entirely of carbon dioxide.

3. In a method of vacuum packaging cheese the improvement which comprises: placing a cheese selected from the group consisting of pasteurized process cheeses and fully-cured natural cheeses which no longer evolve any substantial amount of gases in an atmosphere of carbon dioxide; sealing said cheese while within said atmosphere within a flexible, pliable wrapper under a substantial degree of vacuum, any gas remaining in the wrapper being substantially all carbon dioxide; and permitting said package to remain sealed, whereby upon standing the carbon dioxide is absorbed by the cheese to produce a greater degree of vacuum within the package than obtained at the time of sealing.

References Cited in the file of this patent

UNITED STATES PATENTS

| 940,848 | Baldwin | Nov. 23, 1909 |
| 1,232,271 | Franks | July 3, 1917 |
| 1,868,547 | Stevenson | July 26, 1932 |
| 2,304,591 | Pape et al. | Dec. 8, 1942 |
| 2,471,867 | Fisher et al. | May 31, 1949 |
| 2,569,217 | Bagdigian | Sept. 25, 1951 |